(12) United States Patent
Gerding

(10) Patent No.: US 6,409,275 B1
(45) Date of Patent: Jun. 25, 2002

(54) FRAME ATTACHMENT FOR VEHICLE

(75) Inventor: Ronald B. Gerding, Florence, AL (US)

(73) Assignee: The Heil Company, Chattanooga, TN (US)

( * ) Notice: Subject to any disclaimer, the term of this patent is extended or adjusted under 35 U.S.C. 154(b) by 0 days.

(21) Appl. No.: 09/563,418

(22) Filed: May 2, 2000

(51) Int. Cl.[7] .................................................. B60P 1/16
(52) U.S. Cl. ........................ 298/22 R; 410/80; 296/35.3
(58) Field of Search ............................... 298/1 A, 17 R, 298/22 R, 17 T; 410/80; 248/503, 500; 296/35.3

(56) References Cited

U.S. PATENT DOCUMENTS

| | | | |
|---|---|---|---|
| 615,563 A | * 12/1898 | Leiter | ......................... 296/35.3 |
| 1,630,145 A | 5/1927 | Travis, Jr. | |
| 1,798,469 A | 3/1931 | Heil et al. | |
| 1,862,632 A | 6/1932 | Perin | |
| 1,925,296 A | 9/1933 | Barrett | |
| 2,363,172 A | 11/1944 | Franks | |
| 2,427,603 A | 9/1947 | Higgins | |
| 2,640,725 A | 6/1953 | Dale | |
| 2,842,398 A | 7/1958 | Chaney | |
| 2,881,024 A | 4/1959 | Saiberlich | |
| 2,902,246 A | 9/1959 | Lapsley | |
| 2,942,912 A | 6/1960 | Lucas et al. | |
| 3,701,563 A | 10/1972 | Lasko et al. | |
| 3,833,261 A | 9/1974 | Dingler | |
| 4,000,924 A | 1/1977 | Blasingame | |
| 4,089,539 A | * 5/1978 | Berger | .......................... 410/80 |
| 4,126,357 A | 11/1978 | Day | |
| 4,326,749 A | 4/1982 | Bender | |
| 4,456,414 A | * 6/1984 | Williams | ...................... 410/80 |
| 4,969,690 A | 11/1990 | Smith | |
| 5,033,794 A | * 7/1991 | Vick | .......................... 298/22 R |
| 5,228,739 A | * 7/1993 | Love | ...................... 296/35.3 X |
| 5,829,946 A | 11/1998 | McNeilus et al. | |
| 5,836,657 A | 11/1998 | Tilley et al. | |
| 6,036,275 A | * 3/2000 | Hansen et al. | ............. 298/17 T |
| 6,186,596 B1 | * 2/2001 | Jones | ........................ 298/22 R |

FOREIGN PATENT DOCUMENTS

GB          196495         4/1923

OTHER PUBLICATIONS

Heil, Installation Instructions, Heil Telescopic Hoists, Models HPT53, HPT63; 38 pages, No Date.

* cited by examiner

Primary Examiner—Stephen T. Gordon
(74) Attorney, Agent, or Firm—Chambliss, Bahner & Stophel, P.C.

(57) ABSTRACT

An assembly for mounting an accessory to the chassis of a vehicle includes an accessory mounting frame which includes a first base plate and a second base plate, and a pair of clamping mechanisms for mounting the base plates of the mounting frame to the horizontal portions of a pair of longitudinal frame components of the chassis. In a preferred embodiment of the invention, each clamping mechanism includes an elongated clamp block having a first end and a second end, and a fastener that is adapted to fasten the clamp block to the base plate. The first end of each clamp block is adapted to engage a surface of the horizontal portion of a longitudinal frame component, while the second end is adapted to engage the base plate while the base plate also engages a surface of the horizontal portion of the longitudinal frame component that is not engaged by the first end of the clamp block.

15 Claims, 9 Drawing Sheets

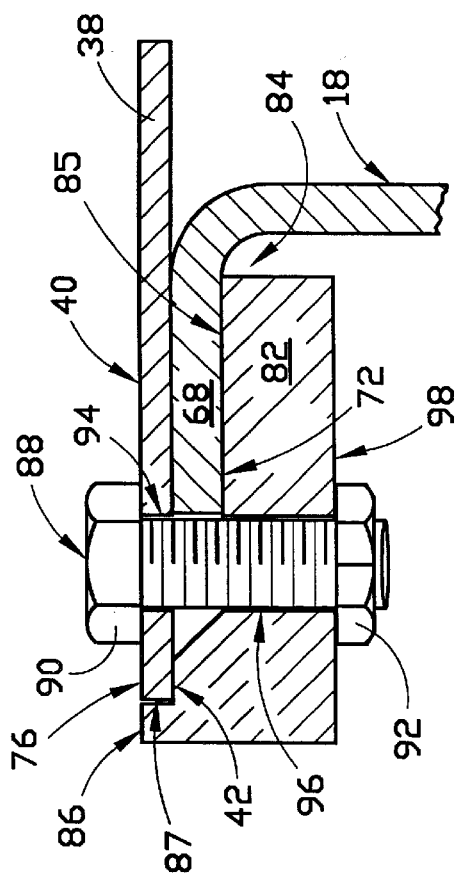
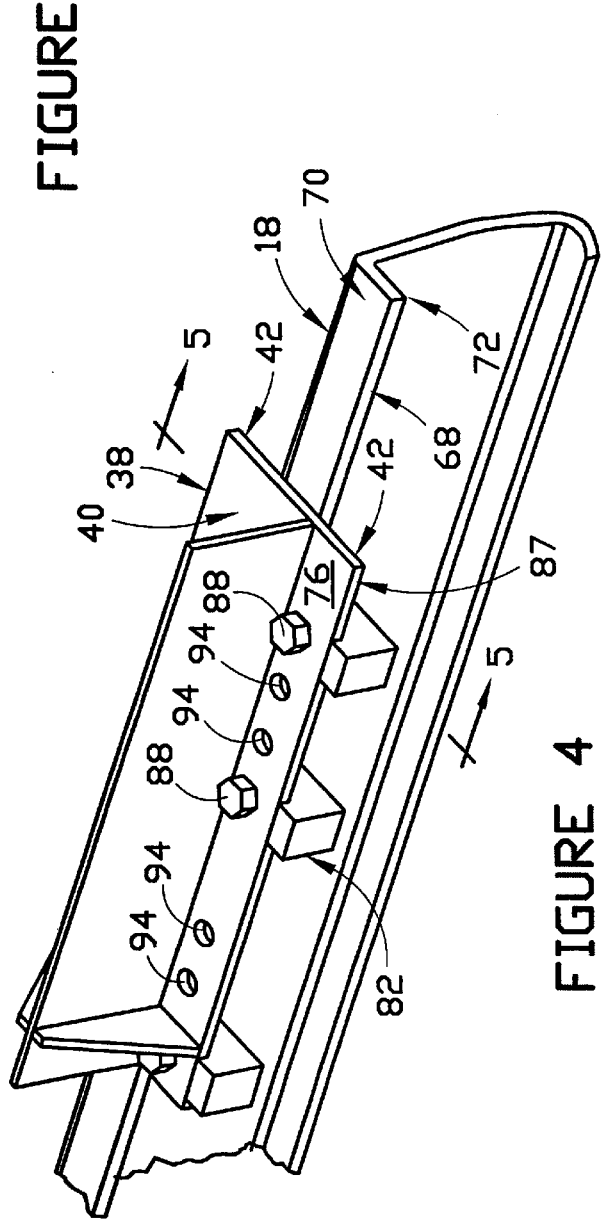
FIGURE 5
FIGURE 4

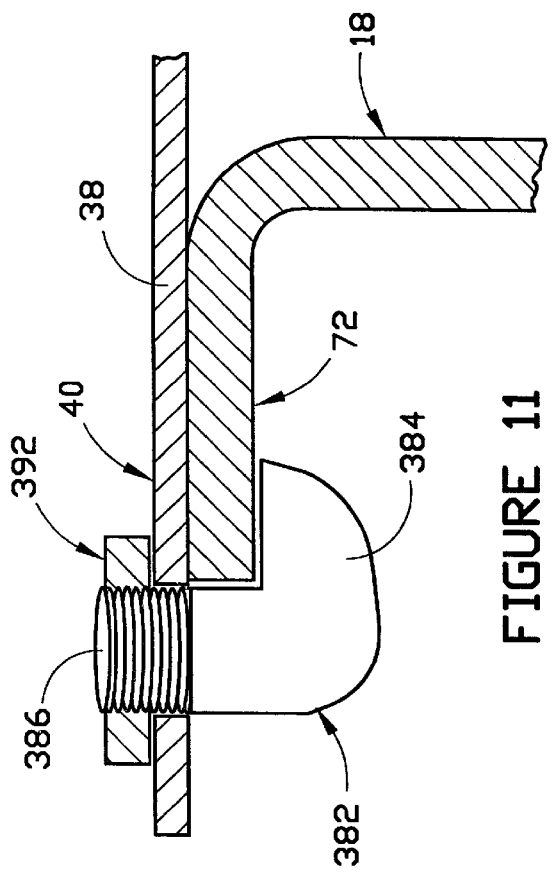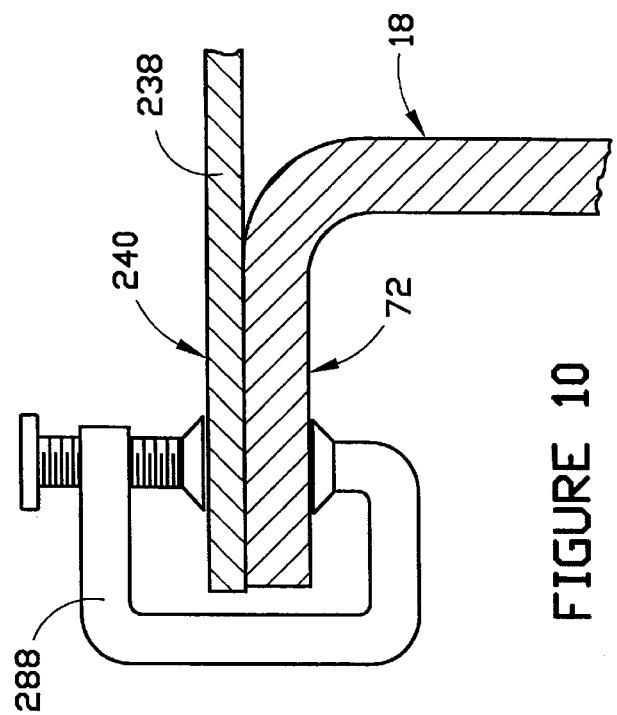

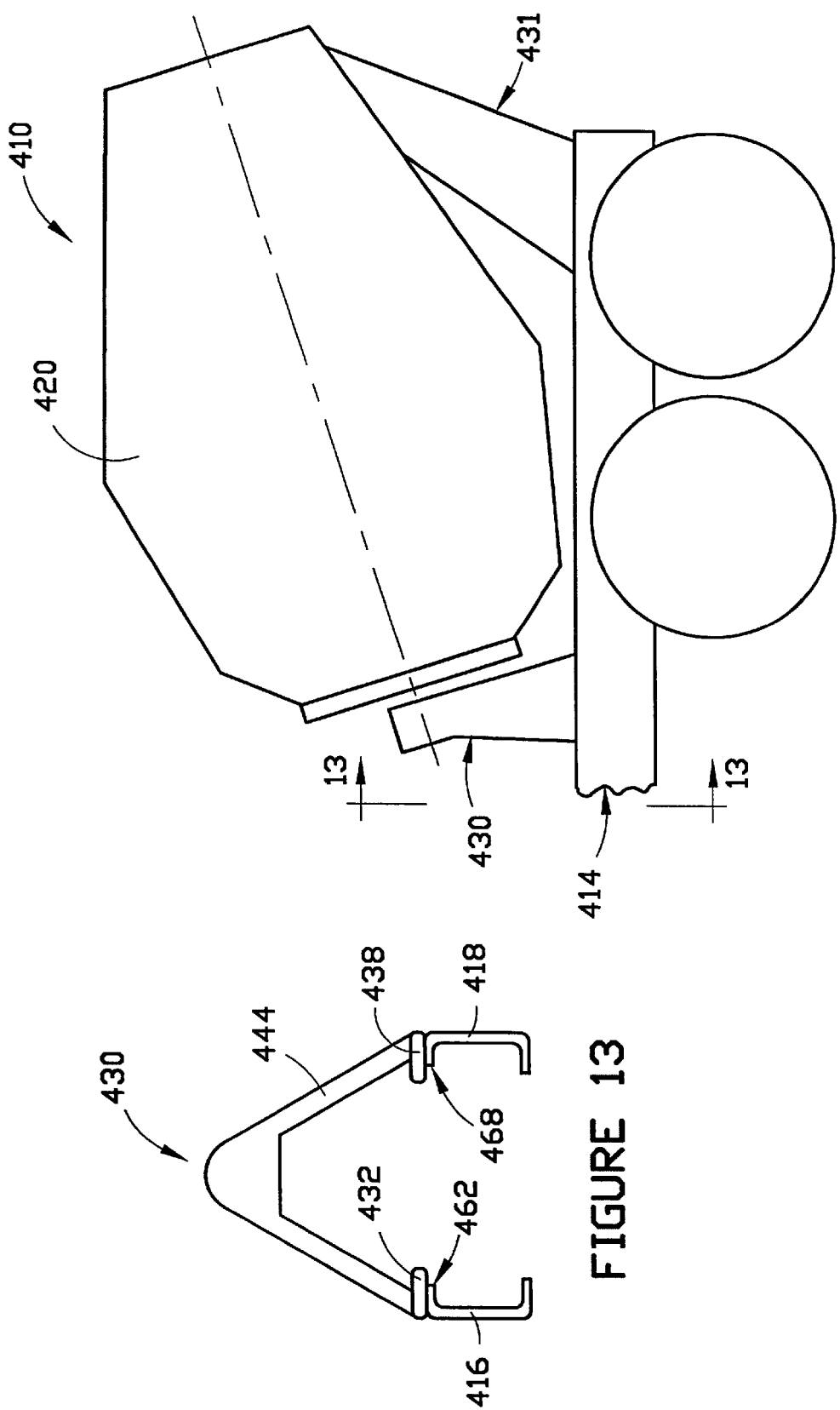

FRAME ATTACHMENT FOR VEHICLE

FIELD OF THE INVENTION

This invention relates generally to a vehicle having an accessory that is mounted to the chassis, such as the telescoping hoist cylinder that is mounted on the chassis of a dump truck for use in raising the dump bed. The invention provides an apparatus by which a frame for such an accessory may be attached to the chassis of a vehicle without welding onto, or drilling holes in, the chassis.

BACKGROUND AND DESCRIPTION OF THE PRIOR ART

A variety of working vehicles are provided with an accessory that is mounted to the vehicle chassis and adapted for a particular purpose or function. Some such accessories are supported in a fixed manner on the vehicle chassis, and others are supported in a dynamic manner. An example of a vehicle having an accessory that is supported in a fixed manner on the chassis is a refuse hauling and compaction truck. Such vehicle includes a static refuse/compaction body that is supported in a fixed position (relative to the chassis) by a frame that is attached to the vehicle chassis. Examples of a vehicles having components that are supported in a dynamic relationship to the chassis are concrete mixer trucks and dump trucks. Concrete mixer trucks include support frames that support the mixer in such a manner that it may rotate about a fixed axis, and dump trucks include support frames that support one or more telescoping hoist cylinders and a dump body that is raised thereby.

Typically, the dump body of a dump truck is pivotally attached at the rear end of the vehicle chassis and at least one weight-bearing, telescoping hoist cylinder is mounted to the chassis behind the cab. The hoist cylinder or cylinders are adapted for raising the front of the dump body off the chassis while the rear end pivots about a horizontal axis at its point of attachment to the chassis. The most common hoist cylinder configuration utilizes a single hoist cylinder, the base of which is attached to a frame mounted on the chassis behind the cab, and the extension end or piston of which is attached to the dump body at a point near its front end; however, other arrangements and configurations of hoist cylinders are known and are susceptible to the advantages provided by the present invention. In addition, the invention may be applied to other types of vehicles which include telescoping hoist cylinders that are adapted for raising components such as lift buckets, ladders and the like. The invention may also be applied to other types of vehicles which include other types of accessories that are mounted on the vehicle chassis. Such vehicles include refuse hauling and compaction trucks and concrete mixer trucks.

As has been mentioned, the hoist cylinder of a dump truck is typically mounted on the vehicle chassis behind the cab. The hoist cylinder is usually mounted in a mounting frame that is bolted to the vehicle chassis. Additional hoist components, such as scissors mechanisms, may also be mounted to the frame. Mounting arrangements for hoist cylinders are illustrated and/or described in U.S. Pat. No. 1,798,469 of Heil et al., U.S. Pat. No. 1,925,296 of Barrett, U.S. Pat. No. 2,640,725 of Dale, U.S. Pat. No. 2,842,398 of Chaney and U.S. Pat. No. 4,326,749 of Bender.

One disadvantage of conventional hoist cylinder frame mounting assemblies arises from the fact that other components, such as, for example, fuel tanks, air tanks and battery boxes, are invariably mounted to or between the longitudinal frame components of the vehicle chassis. Consequently, in order to mount a conventional hoist cylinder frame mounting assembly to the vehicle, or to obtain access to a previously mounted hoist cylinder, it is necessary to first remove such ancillary components from the chassis. It would be desirable therefore, if a hoist cylinder mounting apparatus could be provided that would permit access to the hoist cylinder mounting frame from above or beneath (preferably above) the vehicle chassis.

Another disadvantage of the conventional mounting mechanisms for hoist cylinder frames is that high localized stresses may be placed on bolt holes through the chassis components by the loads transmitted through the hoist cylinder. It would be desirable therefore if a hoist cylinder mounting apparatus could be provided that could be mounted to the chassis without being bolted through holes in the chassis components.

A number of removable mechanical attachment mechanisms are known for attachment of freight compartments and other truck body components to the chassis of a truck. Such devices are illustrated and described in U.S. Pat. No. 1,630,145 of Travis, U.S. Pat. No. 1,862,632 of Perin, U.S. Pat. No. 2,363,172 of Franks, U.S. Pat. No. 2,427,603 of Higgins, U.S. Pat. No. 2,942,912 of Lucas et al., U.S. Pat. No. 4,000,924 of Blasingame, U.S. Pat. No. 4,969,690 of Smith and U.S. Pat. No. 5,829,946 of McNeilus et al. None of these devices are adapted for attachment of a hoist cylinder mounting frame to the chassis of a vehicle, and consequently, these devices are generally not designed to withstand the stresses placed upon the hoist cylinder mounting frame of a dump truck. Furthermore, most of these attachment devices involve complicated mechanisms that nevertheless must be accessed from the side of the truck chassis. In addition, most of these attachment devices are not accessible without first removing other chassis-mounted components. It would be desirable therefore, if a simple attachment mechanism could be provided that could be employed to securely attach a hoist cylinder or other accessory mounting frame to the chassis of a vehicle, while providing access to the mounting frame without first requiring the removal of other chassis-mounted components.

ADVANTAGES OF THE INVENTION

An advantage of this invention is that it provides for mounting a hoist cylinder or other accessory assembly to the chassis of a vehicle without requiring welding or the drilling of holes through the chassis components. Another advantage of this invention is that it permits access to the hoist cylinder assembly or other accessory from above or from beneath the vehicle chassis. Still another advantage of this invention is that it provides access to the accessory without requiring that other chassis-mounted components be removed. Yet another advantage of the invention is that it provides a simple attachment mechanism for securely attaching an accessory mounting frame to the chassis of a vehicle.

Additional advantages of this invention will become apparent from an examination of the drawings and the ensuing description.

EXPLANATION OF TECHNICAL TERMS

As used herein, the term accessory means a component of a vehicle that relates to the use or function for which the vehicle is placed in service. Such accessories include, for example, the telescoping hoist cylinders and dump bodies of dump trucks, the rotating mixers of concrete mixer trucks and the refuse bodies of refuse hauling and compaction trucks.

As used herein, the term chassis means the frame supporting the engine, wheels and suspension system of a vehicle.

As used herein, the term clamping a base plate to the horizontal portion of a frame component means causing the base plate and the horizontal portion to be held together without welding and without drilling holes through the frame component.

SUMMARY OF THE INVENTION

The invention comprises an assembly for mounting an accessory to the chassis of a vehicle which includes a first longitudinal frame component and a second longitudinal frame component. The longitudinal frame components are disposed along the long axis of the vehicle in a substantially parallel relationship to each other, and each of the longitudinal frame components includes a substantially horizontal portion having an upper surface and an oppositely disposed lower surface. The assembly includes an accessory mounting frame comprising a first base plate and a second base plate. The assembly also includes means for clamping the first base plate to the horizontal portion of the first frame component, and means for clamping the second base plate to the horizontal portion of the second frame component.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 4 is a perspective view of a portion of the hoist cylinder mounting frame and one of the longitudinal frame components of the vehicle chassis of FIG. 3, illustrating the attachment of the hoist cylinder frame to the chassis component according to a preferred embodiment of the invention.

FIG. 5 is a partial sectional view of a portion of the hoist cylinder frame, vehicle chassis and elongated clamp block of FIG. 4, taken along the line 5—5 of FIG. 4.

FIG. 10 is a sectional view illustrating the use of another alternative clamping means according to the invention.

FIG. 11 is a sectional view illustrating the use of still another alternative clamping means according to the invention.

FIG. 12 is a partial side view of a concrete mixer truck showing an accessory mounting frame that may be attached to the chassis of the truck according to the invention.

FIG. 13 is a partial sectional view illustrating the attachment of one of the concrete mixer mounting frames of FIG. 12 to the chassis of the vehicle according to the invention, taken along line 13—13 of FIG. 12.

DESCRIPTION OF THE PREFERRED EMBODIMENTS OF THE INVENTION

Figure 1:
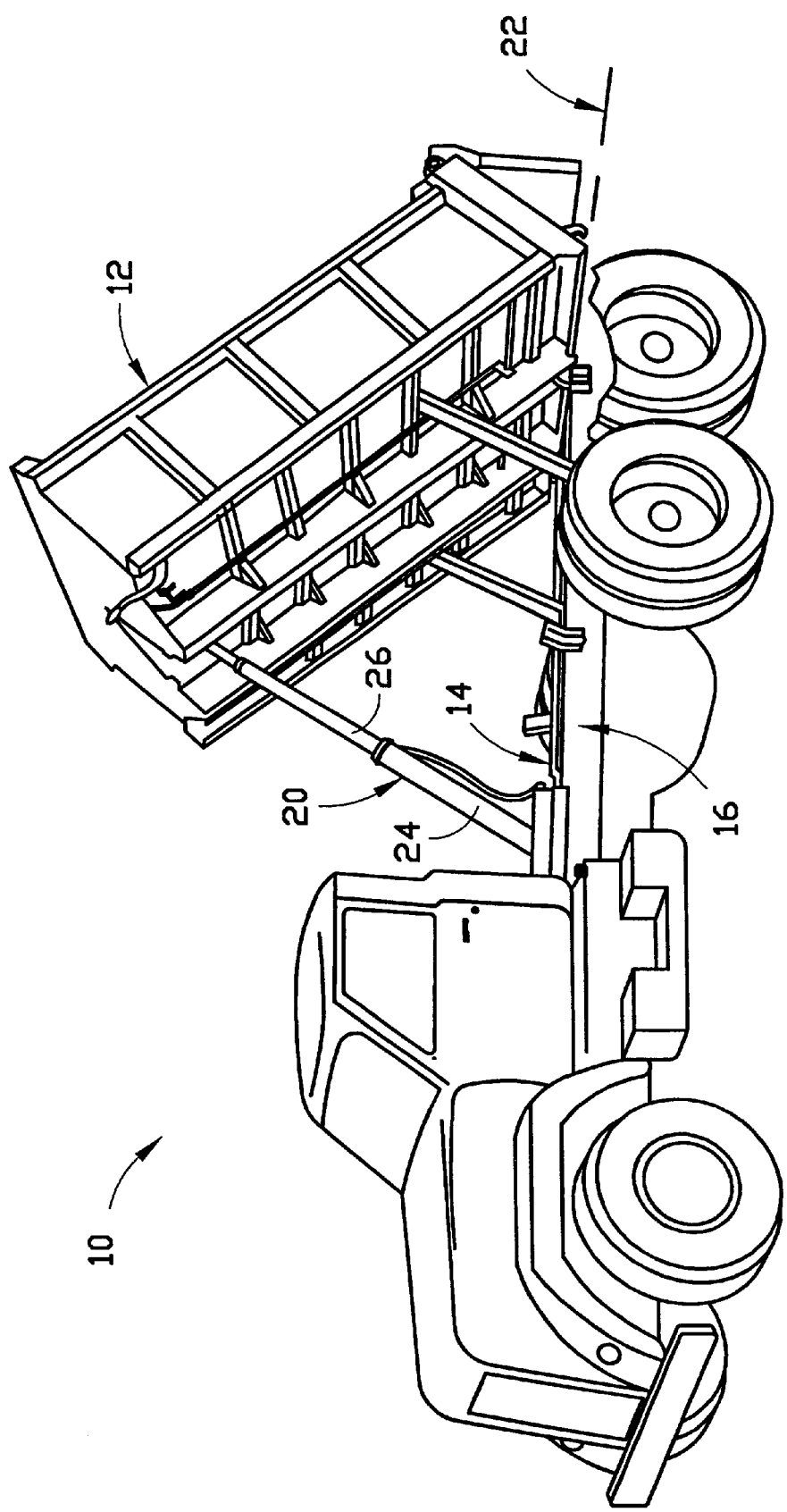
FIG. 1 is a perspective view of a vehicle to which the invention may be advantageously applied.

Referring now to FIG. 1, dump truck 10 comprises a vehicle to which an accessory may be attached according to the invention. As shown therein, truck 10 includes dump body 12 which is pivotally attached to chassis 14 at the rear end thereof. Chassis 14 includes a first longitudinal frame component 16 and a second longitudinal frame component 18 (see FIG. 3), which components are disposed along the long axis of the vehicle in substantially parallel relationship to each other. Truck 10 also includes an accessory, namely telescoping hoist cylinder 20 that is adapted to raise the front of the dump body off the chassis while the rear end of the dump body pivots about horizontal axis 22 at the point of attachment of the dump body to the vehicle chassis. Hoist cylinder 20 includes a base cylinder 24, and one or more telescoping cylinder sections 26 and a terminal piston rod 28 (see FIG. 3) that may be extended from and retracted into the base cylinder. Preferably, hoist cylinder 20 is of a hydraulic type wherein hydraulic fluid or oil may be pumped into base cylinder 24 to extend and lift cylinder sections 26 and piston rod 28.

Figure 2:
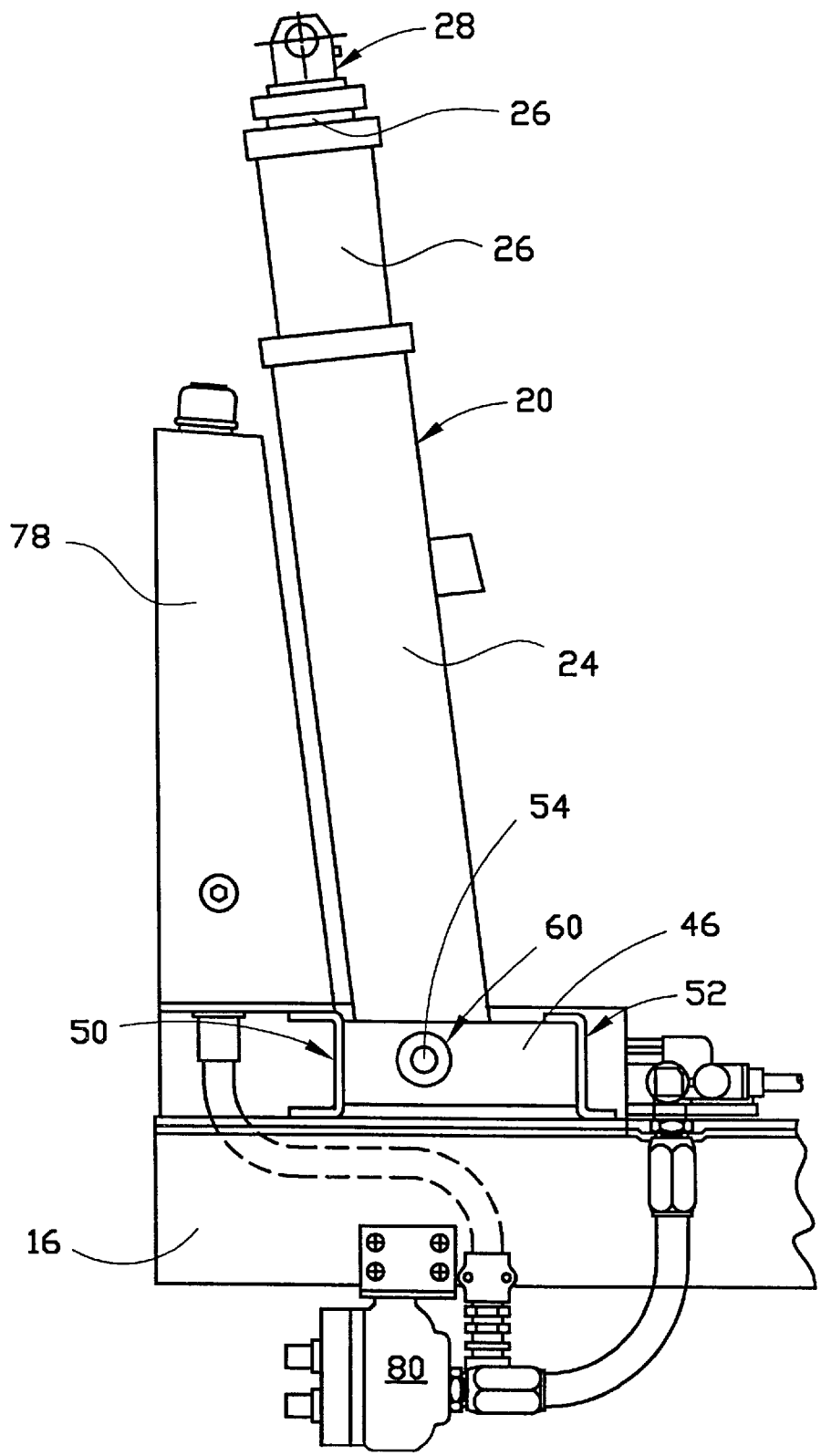
FIG. 2 is a side view of the telescoping hoist cylinder assembly of the vehicle of FIG. 1, showing a portion of the hoist cylinder (accessory) mounting frame.

FIG. 2 illustrates the hoist cylinder assembly of truck 10, and shows the hoist cylinder in the fully retracted position. Oil or other hydraulic fluid for the hoist cylinder is contained in oil tank 78, and is pumped by pump 80 to and from the cylinder through valves and lines in a manner known to those having ordinary skill in the art to which the invention relates.

Figure 3:
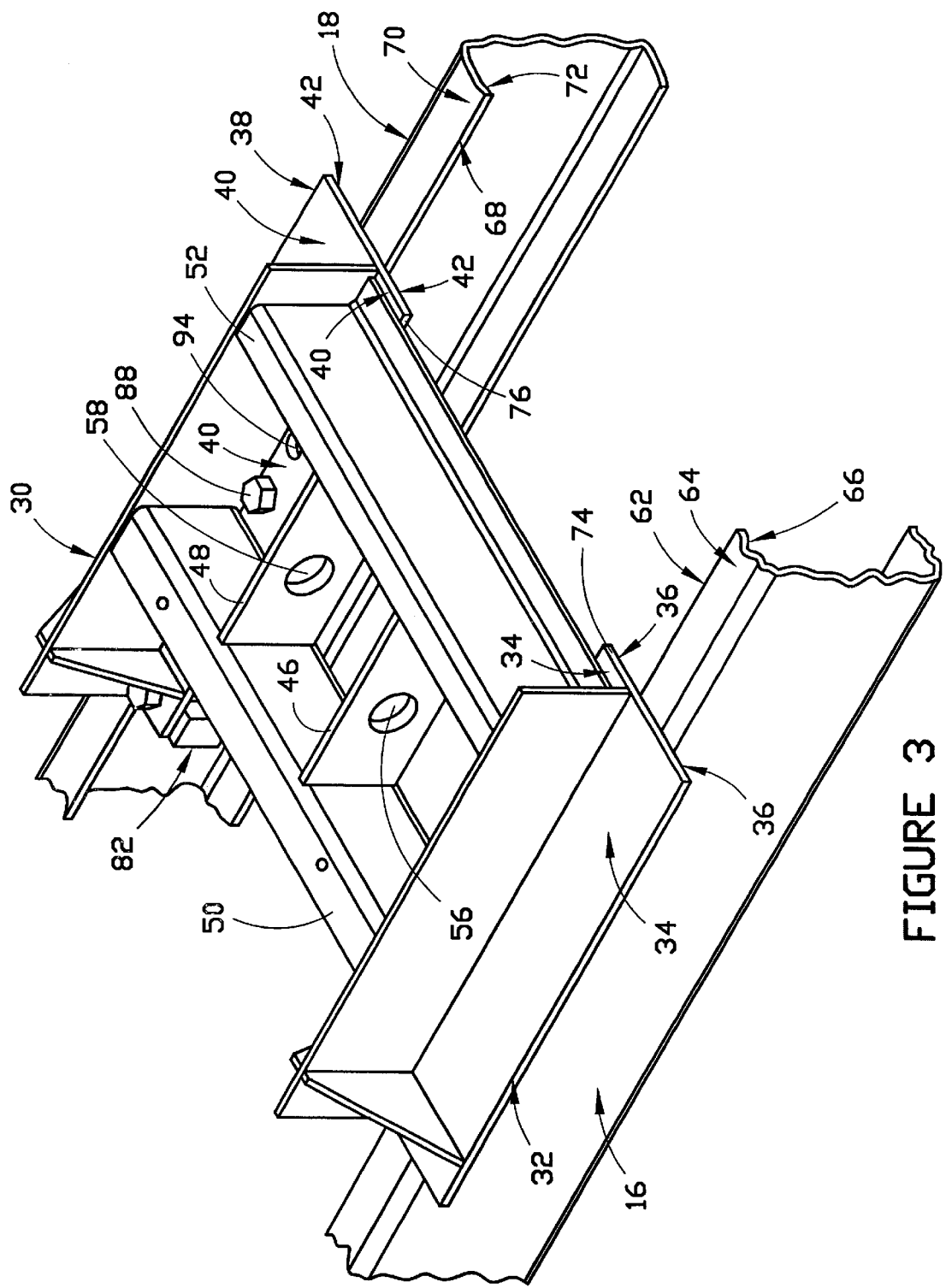
FIG. 3 is a perspective view of a portion of the chassis of the vehicle of FIG. 1, illustrating how the invention may be used to mount the telescoping hoist cylinder to the chassis.

FIGS. 2 and 3 illustrate the accessory mounting assembly in which the base of hoist cylinder 20 is mounted. Accessory (or hoist cylinder) mounting frame 30 (illustrated fully in FIG. 3 and partially, as hereinafter explained, in FIG. 2) includes first base plate 32 having upper surface 34 and lower surface 36, and second base plate 38 having upper surface 40 and lower surface 42. As best shown in FIG. 3, the preferred embodiment of the invention includes accessory (or hoist cylinder) mount 44, which extends between the first and second base plates. Hoist cylinder mount 44 is comprised of first and second mounting plates 46 and 48 and first and second transverse plates 50 and 52. As shown in FIG. 2, trunnion 54 of hoist cylinder 20 is pivotally mounted in holes 56 and 58 that are provided in first and second mounting plates 46 and 48 of hoist cylinder mounting frame 30. A grease fitting 60 is mounted over each end of the trunnion (only one of which is shown) to insure that hoist cylinder 20 is free to pivot about its connection to accessory mounting frame 30, and the trunnion is secured in place between the mounting plates by a pair of cotter pins (not shown).

Accessory mounting frame 30 is mounted according to the invention on longitudinal frame components 16 and 18 of chassis 14. As shown in FIG. 3, first frame component 16 of chassis 14 includes a substantially horizontal portion 62 having an upper surface 64 and an oppositely disposed lower surface 66. Similarly, second frame component 18 includes a substantially horizontal portion 68 having an upper surface 70 and an oppositely disposed lower surface 72. In the embodiment of the invention illustrated in FIG. 3, base plates 32 and 38 are arranged so that hoist cylinder mount 44 will support cylinder 20 while a portion of lower surface 36 of first base plate 32 is in contact with upper surface 64 of horizontal portion 62 of first longitudinal frame component 16, and while a portion of lower surface 42 of second base plate 38 is in contact with upper surface 70 of horizontal portion 68 of second longitudinal frame component 18. Also as illustrated in FIG. 3, base plate 32 is preferably wider than horizontal portion 62 of longitudinal frame component 16 with which it is in contact so that an inwardly extending part 74 of base plate 32 extends beyond horizontal portion 62 of first longitudinal frame component 16 towards second frame component 18. Similarly, base plate 38 is preferably wider than horizontal portion 68 of longitudinal frame component 18 with which it is in contact so that an inwardly extending part 76 of base plate 38 extends beyond horizontal portion 68 of second longitudinal frame component 18 towards first frame component 16.

The invention also includes means for clamping first base plate 32 to horizontal portion 62 of first frame portion 16 and means for clamping second base plate 38 to horizontal portion 68 of second frame portion 18. Preferably, the means for clamping a base plate to the horizontal portion of the frame component with which it is in contact comprises a plurality of elongated clamp blocks and a fastener for each clamp block.

A preferred embodiment of the clamp block and a preferred embodiment of the fastener of the invention are illustrated in FIGS. 3, 4 and 5. As shown therein, clamp block 82 has a first end 84 (on the right side of block 82 as viewed in FIG. 5), a primary surface 85 near the first end, and a second end 86 (on the left side of block 82 as viewed in FIG. 5). In the embodiment of the invention illustrated in FIGS. 3, 4 and 5, primary surface 85 is adapted to engage lower surface 72 of horizontal portion 68 of longitudinal frame component 18 and second end 86 is adapted to engage lower surface 42 of inwardly extending part 76 of base plate 38. Preferably, as shown in FIG. 5, second end 86 of clamp block 82 is also adapted to engage end wall 87 of the inwardly extending part.

Preferred fastener 88 is comprised of bolt 90 and nut 92, and may also include a lock washer (not shown). In this embodiment of the invention, one or more holes 94 are provided through inwardly extending part 76 of base plate 38, and hole 96 is provided through clamp block 82 at a location intermediate between first end 84 and second end 86. Clamp block 82 is positioned against inwardly extending part 76 of base plate 38 of the frame assembly and against lower surface 72 of horizontal portion 68 of longitudinal frame component 18, as shown in FIGS. 4 and 5, so that hole 96 is in substantial alignment with one of holes 94 through the inwardly extending part of the base plate. Bolt 90 is placed through a hole 94 in the base portion and through corresponding hole 96 in the clamp block, and is secured thereto with nut 92. Fastener 88 is thus adapted to bear against upper surface 40 of inwardly extending part 76 of base plate 38 and against secondary surface 98 of clamp block 82 (located opposite primary surface 85) while the primary surface of the clamp block engages lower surface 72 of horizontal portion 68 and second end 86 of the clamp block engages inwardly extending part 76 of base plate 38.

In a similar fashion (although not shown in the drawings), preferred fastener 88 is preferably adapted to bear against upper surface 34 of inwardly extending part 74 of base plate 32 and against secondary surface 98 of clamp block 82 while primary surface 85 of the clamp block engages lower surface 66 of horizontal portion 62 of longitudinal frame component 16 and second end 86 engages inwardly extending part 74 of base plate 32.

Figure 7:
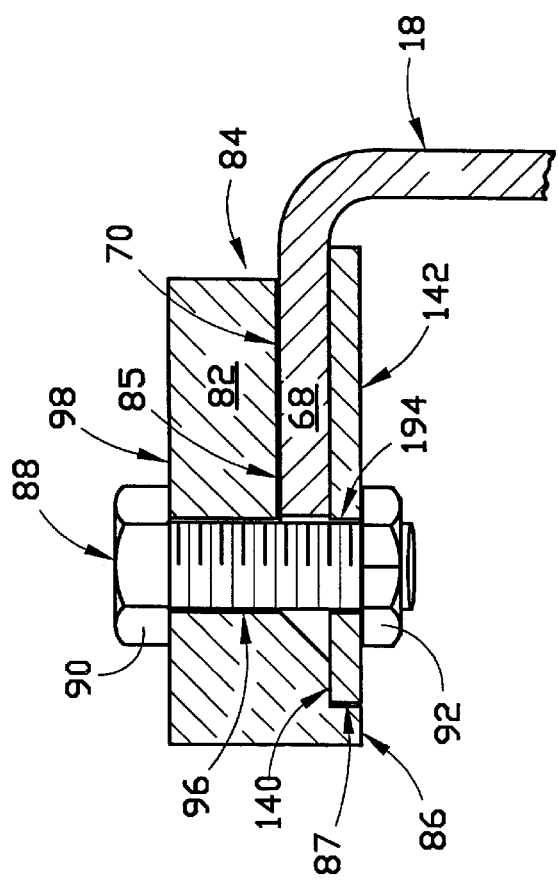
FIG. 7 is a partial sectional view of a portion of the accessory mounting frame, vehicle chassis, and elongated clamp block illustrating an alternative arrangement of the components that may be used according to the invention.
Figure 6:
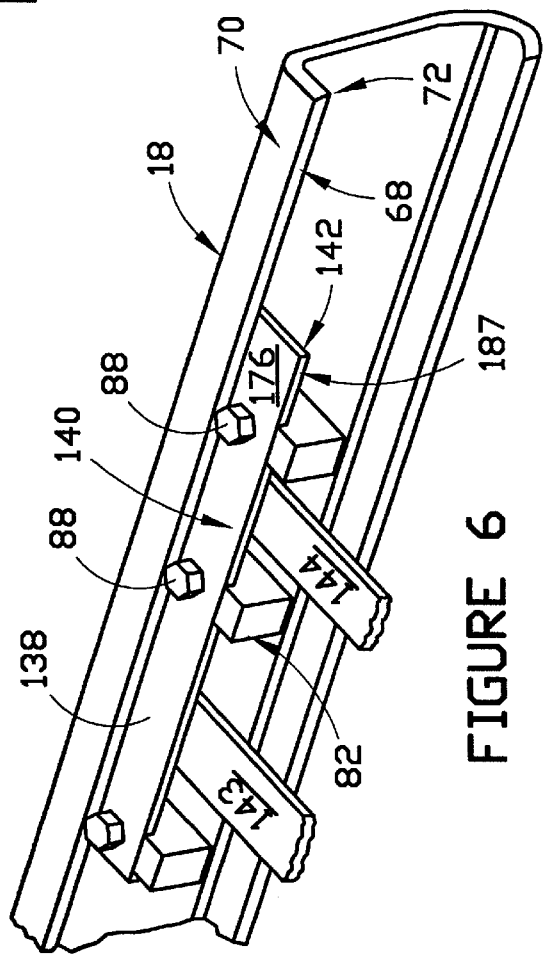
FIG. 6 is a perspective view of a portion of an assembly for mounting an accessory mounting frame in an alternative manner to that shown in FIGS. 3, 4 and 5, illustrating the attachment of the accessory mounting frame to one of the longitudinal frame components of a vehicle chassis according to a preferred embodiment of the invention.

Another embodiment of the invention is illustrated in FIGS. 6 and 7. A portion of an accessory mounting frame is shown therein, which mounting frame is adapted for mounting according to the invention on longitudinal frame components 16 (not shown) and 18 of chassis 14. As shown in FIGS. 6 and 7, second longitudinal frame component 18 includes a substantially horizontal portion 68 having an upper surface 70 and an oppositely disposed lower surface 72. First base plate (not shown) and second base plate 138 are arranged so that an accessory mount (comprised in part of mount components 143 and 144) extending between the first and second base plates will support an accessory such as cylinder 20 while a portion of the upper surface of the first base plate is in contact with the lower surface of the horizontal portion of the first longitudinal frame component (also not shown), and while a portion of upper surface 140 of second base plate 138 is in contact with lower surface 72 of horizontal portion 68 of second longitudinal frame component 18. Although not shown, it is preferred that the first base plate be wider than the horizontal portion of the longitudinal frame component with which it is in contact so that an inwardly extending part of the first base plate extends beyond the horizontal portion of the first frame component towards second frame component 18. Similarly, base plate 138 is preferably wider than horizontal portion 68 of longitudinal frame component 18 with which it is in contact so that an inwardly extending part 176 of base plate 138 extends beyond horizontal portion 68 of second longitudinal frame component 18 towards the first frame component.

This embodiment of the invention also includes means for clamping the first base plate to the horizontal portion of the first longitudinal frame component (not shown) and means for clamping second base plate 138 to horizontal portion 68 of second longitudinal frame component 18. Preferably, the means for clamping a base plate to the horizontal portion of the frame component with which it is in contact comprises a plurality of elongated clamp blocks and a fastener for each clamp block. The clamp block and fastener that are employed in this embodiment of the invention may be essentially identical to those used in connection with the embodiment illustrated in FIGS. 3, 4 and 5, although they are employed in a slightly different manner in the embodiment of FIGS. 6 and 7. As shown therein, clamp block 82 has a first end 84 (on the right side of block 82 as viewed in FIG. 7), a primary surface 85, and a second end 86 (on the left side of block 82 as viewed in FIG. 7). In the embodiment of the invention illustrated in FIGS. 6 and 7, primary surface 85 is adapted to engage upper surface 70 of horizontal portion 68 of longitudinal frame component 18 and second end 86 is adapted to engage upper surface 140 of inwardly extending part 176 of base plate 138. Preferably, as shown in FIG. 7, second end 86 of clamp block 82 is also adapted to engage end wall 87 of the inwardly extending part. Similarly, as shown in FIG. 6, the second end of clamp block 82 is adapted to engage end wall 187 of the inwardly extending part of base plate 138.

In this embodiment of the invention, one or more holes 194 are provided through inwardly extending part 176 of base plate 138, and hole 96 is provided through clamp block 82 at a location intermediate between first end 84 and second end 86. Clamp block 82 is positioned against inwardly extending part 176 of base plate 138 of the frame assembly and against upper surface 70 of horizontal portion 68 of longitudinal frame component 18, as shown in FIGS. 6 and 7, so that hole 96 is in substantial alignment with one of holes 194 through the inwardly extending part of the base plate. Bolt 90 is placed through a hole 194 in the base portion and through corresponding hole 96 in the clamp block, and is secured thereto with nut 92. Fastener 88 is thus adapted to bear against lower surface 142 of inwardly extending part 176 of base plate 138 and against secondary surface 98 of clamp block 82 while primary surface 85 of the clamp block engages upper surface 70 of the horizontal portion and second end 86 of the clamp block engages inwardly extending part 176 of base plate 138.

Figure 8:
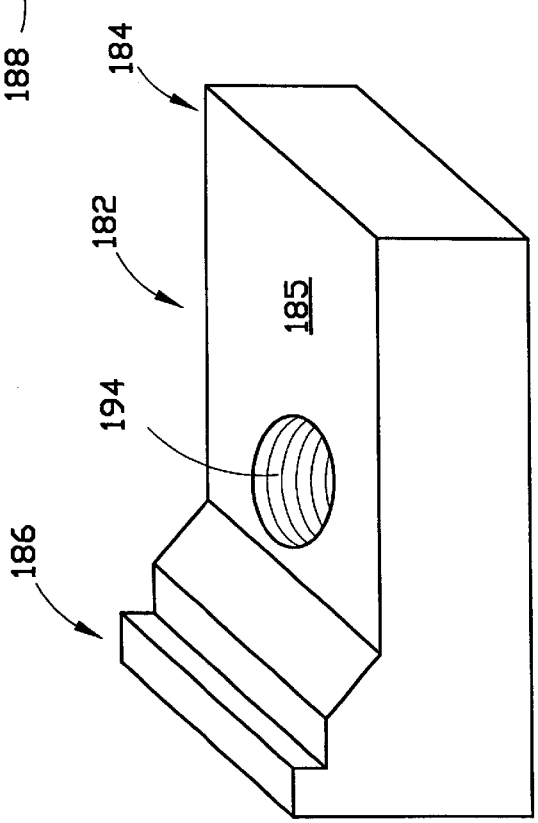
FIG. 8 is a perspective view of another embodiment of an elongated clamp block that may be used according to the invention.

A second embodiment of an elongated clamp block that may be used according to the invention is illustrated in FIG. 8. Clamp block 182 is essentially identical to clamp block 82, in that it has first end 184, primary surface 185 and second end 186; however clamp block 182 is also provided with an intermediate hole 194 that is provided with internal threads. If clamp block 182 is used, a fastener having corresponding external threads (not shown) should be employed to clamp the base plate to the horizontal portion of a frame component.

Figure 9:
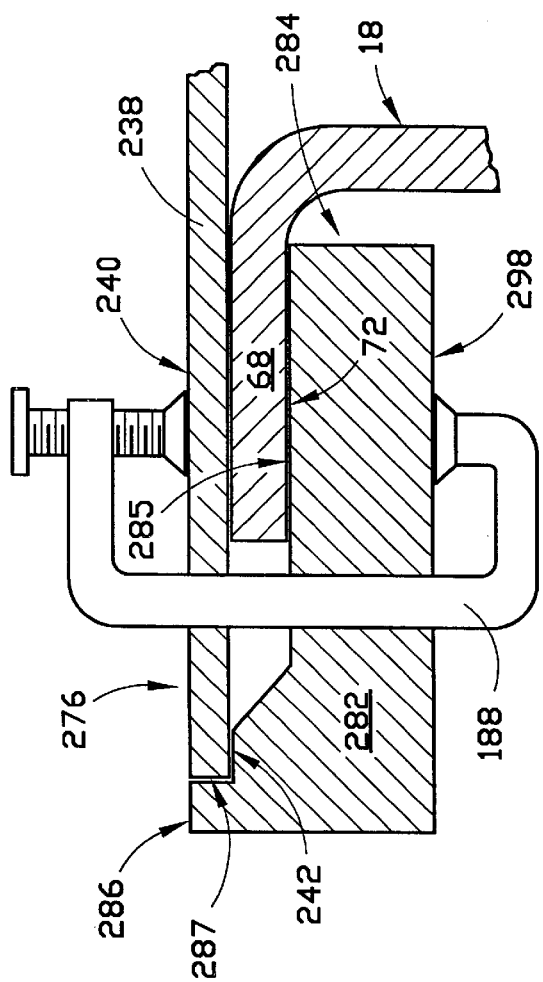
FIG. 9 is a sectional view illustrating the use of an alternative clamping means according to the invention.

A third embodiment of the clamp block and fastener of the invention is illustrated in FIG. 9. As shown therein, clamp block 282 and fastener 188 may be used to mount an accessory mounting frame that includes base plates such as plates 32 and 38 of FIG. 3. In the embodiment of FIG. 9, clamp block 282 is identical in shape to clamp block 82, but does not include intermediate hole 96. Also as shown in FIG. 9, inwardly extending part 276 of base plate 238 is identical to inwardly extending part 76 of base plate 38, but does not include holes 94. Clamp block 282 has a first end 284 (on the right side of block 282 as viewed in FIG. 9), primary surface 285 near the first end, and a second end 286 (on the left side of block 282 as viewed in FIG. 9). Primary surface 285 is adapted to engage lower surface 72 of horizontal portion 68 of longitudinal frame component 18 and second end 286 is adapted to engage lower surface 242 of inwardly extending part 276 of base plate 238. Preferably, second end 286 of clamp block 282 is also adapted to engage end wall 287 of the inwardly extending part. Fastener 188, provided in the form of a C-clamp, bears against upper surface 240 of inwardly extending part 276 of base plate 238 and against secondary surface 298 of clamp block 282 while primary surface 285 of the clamp block engages lower surface 72 of the horizontal portion and second end 286 of the clamp block engages inwardly extending part 276 of base plate 238. The clamping means of FIG. 9 could also be adapted for use in connection with an accessory mounting assembly such as is illustrated in FIGS. 6 and 7, in which the upper surface of the base plate is clamped against the lower surface of the horizontal portion of the longitudinal frame component.

FIG. 10 illustrates the use of another embodiment of the clamping means of the invention. As shown therein, C-clamp 288, which is similar to clamp 188, may be used without a clamp block, to bear against upper surface 240 of the inwardly extending part of base plate 238 and against lower surface 72 of the horizontal portion of longitudinal frame component 18. The clamping means of FIG. 10 could also be adapted for use in connection with an accessory mounting assembly such as is illustrated in FIGS. 6 and 7, in which the upper surface of the base plate is clamped against the lower surface of the horizontal portion of the longitudinal frame component.

Another embodiment of a clamp block that may used according to the invention is illustrated in FIG. 11. This embodiment of the invention, which combines the clamp block and a threaded portion of the fastener into one structure 382, may be used with an accessory mounting assembly that includes base plates such as plates 32 and 38 of FIG. 3. Referring again to FIG. 11, clamp block 382 includes an engagement portion 384 that is adapted to engage lower surface 72 of horizontal portion 68 of longitudinal frame component 18 and a threaded portion 386 which cooperates with nut 392 to cause the nut to bear against upper surface 40 of inwardly extending part 76 of base plate 38. The clamping means of FIG. 11, like those of FIGS. 9 and 10, could also be adapted for use in connection with an accessory mounting assembly such as is illustrated in FIGS. 6 and 7, in which the upper surface of the base plate is clamped against the lower surface of the horizontal portion of the longitudinal frame component.

FIGS. 12 and 13 show an accessory mounting frame 430 that may be attached to the chassis of concrete mixer truck 410 for use in mounting mixing cylinder 420 to chassis 414 according to the invention. As shown therein, the truck chassis 414 includes first and second longitudinal frame components 416 and 418. First frame component 416 includes a substantially horizontal portion 462 having an upper surface and an oppositely disposed lower surface. Similarly, second frame component 418 includes a substantially horizontal portion 468 having an upper surface and an oppositely disposed lower surface. First and second base plates 432 and 438 are arranged so that mixer mount 444 will support mixer 420 while a portion of the lower surface of first base plate 432 is in contact with the upper surface of horizontal portion 462 of first longitudinal frame component 416, and while a portion of the lower surface of second base plate 438 is in contact with the upper surface of horizontal portion 468 of second longitudinal frame component 418. Also as illustrated in FIG. 13, base plate 432 is preferably wider than horizontal portion 462 of longitudinal frame component 416 with which it is in contact so that an inwardly extending part of base plate 432 extends beyond horizontal portion 462 of first longitudinal frame component 416 towards second frame component 418. Similarly, base plate 438 is preferably wider than horizontal portion 468 of longitudinal frame component 418 with which it is in contact so that an inwardly extending part of base plate 438 extends beyond horizontal portion 468 of second longitudinal frame component 418 towards first frame component 416.

This embodiment of the invention also includes means for clamping first base plate 432 to horizontal portion 468 of first longitudinal frame component 416 and means for clamping second base plate 438 to horizontal portion 468 of second longitudinal frame component 418. Preferably, the means for clamping a base plate to the horizontal portion of the frame component with which it is in contact comprises a plurality of elongated clamp blocks and a fastener for each clamp block. The clamp block and fastener that are employed in this embodiment of the invention may be essentially identical to, and used in the same manner as, those described in connection with the embodiments illustrated in FIGS. 3–5, 6–7, 8, 9, 10 and 11. Furthermore, although not shown in the drawings, mounting frame 431 could also be mounted to longitudinal frame components 416 and 418 in the same manner as mounting frame 430.

Figure 14:
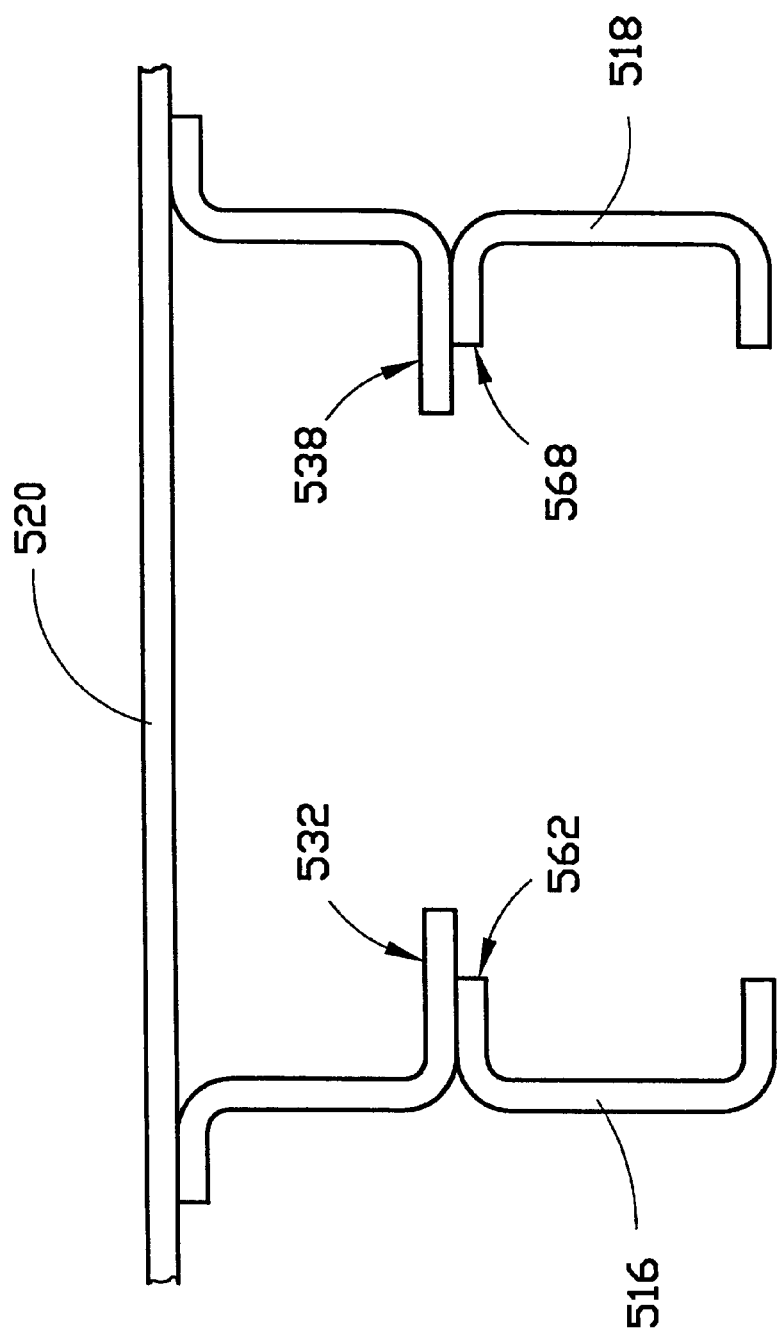
FIG. 14 is a partial sectional view of the accessory mounting frame of a refuse hauling and compaction truck that may be attached to the chassis of the truck according to the invention.

FIG. 14 shows an accessory mounting frame that may be attached to the chassis of a refuse hauling and compaction truck similar to that described in U.S. Pat. No. 5,829,946 to mount a refuse container having container floor 520 to the truck chassis according to the invention. As shown therein, the truck chassis includes first and second longitudinal frame components 516 and 518. First frame component 516 includes a substantially horizontal portion 562 having an upper surface and an oppositely disposed lower surface. Similarly, second frame component 518 includes a substantially horizontal portion 568 having an upper surface and an oppositely disposed lower surface. First and second base plates 532 and 538 are arranged to support a refuse container including floor 520 while a portion of the lower surface of first base plate 532 is in contact with the upper surface of horizontal portion 562 of first longitudinal frame component 516, and while a portion of the lower surface of second base plate 538 is in contact with the upper surface of horizontal portion 568 of second longitudinal frame component 518. Also as illustrated in FIG. 13, base plate 532 is preferably wider than horizontal portion 562 of longitudinal frame component 516 with which it is in contact so that an inwardly extending part of base plate 532 extends beyond horizontal portion 562 of first longitudinal frame component 516 towards second frame component 518. Similarly, base plate 538 is preferably wider than horizontal portion 568 of longitudinal frame component 518 with which it is in contact so that an inwardly extending part of base plate 538 extends beyond horizontal portion 568 of second longitudinal frame component 518 towards first frame component 516.

This embodiment of the invention also includes means for clamping first base plate 532 to horizontal portion 568 of first longitudinal frame component 516 and means for clamping second base plate 538 to horizontal portion 568 of second longitudinal frame component 518. Preferably, the means for clamping a base plate to the horizontal portion of the frame component with which it is in contact comprises a plurality of elongated clamp blocks and a fastener for each clamp block. The clamp block and fastener that are employed in this embodiment of the invention may be essentially identical to, and used in the same manner as, those described in connection with the embodiments illustrated in FIGS. 3–5, 6–7, 8, 9, 10 and 11.

All of the components of the assembly of the invention should be comprised of steel or other suitable material having sufficient properties to provide the necessary support to the telescoping hoist cylinder or other accessory of a vehicle, as is known to those having ordinary skill in the art to which the invention relates.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. An assembly for mounting an accessory to the chassis of a vehicle having a long axis, which chassis includes a first longitudinal frame component and a second longitudinal frame component, which frame components are disposed along the long axis of the vehicle in a substantially parallel relationship to each other, with each of said frame components including a substantially horizontal portion having an upper surface and an oppositely disposed lower surface, which assembly comprises:

(a) an accessory mounting frame comprising a first base plate and a second base plate, said first base plate having an inwardly extending part that extends beyond the horizontal portion of the first frame component, and said second base plate having an inwardly extending part that extends beyond the horizontal portion of the second frame component;

(b) means for clamping the first base plate to the horizontal portion of the first frame component;

(c) means for clamping the second base plate to the horizontal portion of the second frame component.

2. The assembly of claim 1 wherein the accessory is selected from the group consisting of telescoping hoist cylinders, refuse bodies and concrete mixers.

3. The assembly of claim 1 wherein the accessory mounting frame includes an accessory mount extending between the first and the second base plates, with each of said base plates having an upper surface and a lower surface, said base plates being arranged so that the accessory mount will support an accessory while a portion of a surface of the first base plate is in contact with a surface of the horizontal portion of the first frame component and a portion of a surface of the second base plate is in contact with a surface of the horizontal portion of the second frame component.

4. The assembly of claim 1 wherein the means for clamping one of the base plates to the horizontal portion of one of the frame components comprises:

(a) an elongated clamp block having a first end and a second end, a primary surface near the first end and a secondary surface opposite the primary surface, wherein the primary surface is adapted to engage one of the upper or lower surfaces of the horizontal portion of one of the longitudinal frame components, and the second end is adapted to engage the base plate while the base plate also engages the surface of the horizontal portion of the longitudinal frame component that is oppositely disposed from the surface that is engaged by the primary surface of the clamp block;

(b) a fastener that is adapted to fasten the clamp block to the base plate.

5. The assembly of claim 1 wherein the means for clamping the second base plate to the horizontal portion of the second frame component comprises:

(a) an elongated clamp block having a first end and a second end, a primary surface near the first end and a secondary surface opposite the primary surface, wherein the primary surface is adapted to engage one of the upper or lower surfaces of the horizontal portion of the second longitudinal frame component, and the second end is adapted to engage the second base plate while the second base plate also engages the surface of the horizontal portion of the second longitudinal frame component that is oppositely disposed from the surface that is engaged by the primary surface of the clamp block;

(b) a fastener that is adapted to fasten the clamp block to the second base plate.

6. The assembly of claim 4 wherein the fastener is adapted to bear against the first base plate and against the clamp block while the primary surface of the clamp block engages one of the upper or lower surfaces of the horizontal portion of the first frame component and the second end of the clamp block engages the first base plate.

7. The assembly of claim 4 wherein the clamp block is provided with a hole having internal threads, and wherein the fastener is provided with corresponding external threads so that such fastener may be threaded into the clamp block.

8. The assembly of claim 4 wherein:
 (a) the clamp block is provided with a hole; and
 (b) the fastener for the clamp block comprises a threaded bolt and nut assembly; and
 (c) the bolt extends through the hole in the clamp block; and
 (d) the fastener bears against the first base plate and against the secondary surface of the clamp block.

9. An assembly for mounting an accessory to the chassis of a vehicle having a long axis, which chassis includes a first longitudinal frame component and a second longitudinal frame component, which components are disposed along the long axis of the vehicle in a substantially parallel relationship to each other, with each of said frame components including a substantially horizontal portion having an upper surface and an oppositely disposed lower surface, which assembly comprises:
 (a) an accessory mounting frame comprising a first base plate, a second base plate, and an accessory mount extending between the first and the second base plates, with each of said base plates having an upper surface and a lower surface, said base plates being arranged so that the accessory mount will support an accessory while a portion of the lower surface of the first base plate is in contact with the upper surface of the horizontal portion of the first frame component and a portion of the lower surface of the second base plate is in contact with the upper surface of the horizontal portion of the second frame component, wherein each base plate is wider than the horizontal portion of the longitudinal frame component with which it is in contact so that an inwardly extending part of the first base plate extends beyond the horizontal portion of the first frame component towards the second frame component and an inwardly extending part of the second base plate extends beyond the horizontal portion of the second frame component towards the first frame component;
 (b) means for clamping the first base plate to the horizontal portion of the first frame component;
 (c) means for clamping the second base plate to the horizontal portion of the second frame component.

10. The assembly of claim 9 wherein the means for clamping the first base plate to the horizontal portion of the first frame component comprises:
 (a) an elongated clamp block having a first end and a second end, a primary surface near the first end and a secondary surface opposite the primary surface, wherein the primary surface is adapted to engage the lower surface of the horizontal portion of the first longitudinal frame component and the second end is adapted to engage the inwardly extending part of the first base plate;
 (b) a fastener that is adapted to bear against the upper surface of the inwardly extending part of the first base plate and against the secondary surface of the clamp block while the primary surface of the clamp block engages the lower surface of the horizontal portion of the first frame component and the second end of the clamp block engages the inwardly extending part of the first base plate.

11. An assembly for mounting a telescoping hoist cylinder to the chassis of a vehicle having a long axis, which chassis includes a first longitudinal frame component and a second longitudinal frame component, which components are disposed along the long axis of the vehicle in a substantially parallel relationship to each other, with each of said frame components including a substantially horizontal portion having an upper surface and a lower surface, which assembly comprises:
 (a) a hoist cylinder frame comprising a first base plate, a second base plate, and a hoist cylinder mount extending between the first and the second base plates, with each of said base plates having an upper surface and a lower surface, said base plates being arranged so that the hoist cylinder mount will support a telescoping hoist cylinder while a portion of the lower surface of the first base plate is in contact with the upper surface of the horizontal portion of the first frame component and a portion of the lower surface of the second base plate is in contact with the upper surface of the horizontal portion of the second frame component, wherein each base plate is wider than the horizontal portion of the longitudinal frame component with which it is in contact so that an inwardly extending part of the first base plate extends beyond the horizontal portion of the first frame component towards the second frame component and an inwardly extending part of the second base plate extends beyond the horizontal portion of the second frame component towards the first frame component and wherein a base plate hole is provided in each of the inwardly extending parts of the base plates;
 (b) a plurality of elongated clamp blocks, each of which has a first end and a second end, a primary surface near the first end and a secondary surface opposite the primary surface, with each such clamp block also having a clamp block hole intermediate between the first end and the second end, wherein the primary surface is adapted to engage the lower surface of the horizontal portion of the longitudinal frame component with which it is in contact and the second end is adapted to engage the inwardly extending part of the base plate with which it is in contact while the clamp block hole is in substantial alignment with a base plate hole in the inwardly extending part of the base plate with which it is in contact;
 (c) a fastener for each clamp block, said fastener being adapted to extend through the base plate hole in the inwardly extending part of the base plate with which the clamp block is in contact and into the clamp block hole and to bear against the upper surface of the inwardly extending part of the base plate with which the fastener is in contact while the primary surface of the clamp block engages the lower surface of the horizontal portion of the frame component with which it is in contact and the second end of the clamp block engages the inwardly extending part of the base plate with which it is in contact.

12. The assembly of claim 11 wherein the hole in each clamp block is provided with internal threads, and wherein each fastener is provided with corresponding external threads so that each such fastener may be threaded into a clamp block.

13. The assembly of claim 11 wherein the fastener for each clamp block comprises a threaded bolt and nut assembly, and wherein the bolt extends through the clamp block hole, and wherein the fastener bears against the upper surface of the inwardly extending part of the base plate with which it is in contact and against the secondary surface of the clamp block.

14. The assembly of claim 11 wherein the second end of each of the clamp blocks is adapted to engage the lower surface of the inwardly extending part of the base plate with which it is contact while the clamp block hole is in substantial alignment with a base plate hole in the inwardly extending part of the base plate with which it is in contact.

15. The assembly of claim 14 wherein the inwardly extending part of each base plate has an end wall, and wherein the second end of each of the clamp blocks is adapted to engage the end wall of the inwardly extending part of the base plate with which it is in contact while the clamp block hole is in substantial alignment with a base plate hole in the inwardly extending part of the base plate with which it is in contact.

* * * * *